United States Patent
Matmour et al.

(10) Patent No.: US 9,434,823 B2
(45) Date of Patent: Sep. 6, 2016

(54) DIENE COPOLYMER INCLUDING AT LEAST TWO BLOCKS, METHOD FOR SYNTHESIZING SAME AND RUBBER COMPOSITION CONTAINING SAME

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Rachid Matmour, Clermont-Ferrand (FR); Nicolas Seeboth, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 167 days.

(21) Appl. No.: 14/352,158

(22) PCT Filed: Oct. 16, 2012

(86) PCT No.: PCT/EP2012/070452
§ 371 (c)(1),
(2) Date: Apr. 16, 2014

(87) PCT Pub. No.: WO2013/057083
PCT Pub. Date: Apr. 25, 2013

(65) Prior Publication Data
US 2014/0228510 A1    Aug. 14, 2014

(30) Foreign Application Priority Data
Oct. 18, 2011   (FR) ...................... 11 59399

(51) Int. Cl.
| | |
|---|---|
| *C08L 53/00* | (2006.01) |
| *C08L 53/02* | (2006.01) |
| *C08G 81/00* | (2006.01) |
| *C08G 81/02* | (2006.01) |
| *B60C 1/00* | (2006.01) |

(52) U.S. Cl.
CPC ............... *C08G 81/021* (2013.01); *B60C 1/00* (2013.01); *C08G 81/022* (2013.01); *C08L 53/00* (2013.01); *C08L 53/02* (2013.01); *C08F 2438/01* (2013.01)

(58) Field of Classification Search
CPC ..... C08L 53/00; C08L 53/02; C08G 81/021; C08G 81/022
USPC .................. 524/560, 572; 525/192, 227, 232
See application file for complete search history.

(56) References Cited

PUBLICATIONS

Athanasios Touris et al: "Acetylene-Functionalized Lithium Initiators for Anionic Polymerization. Powerful Precursors for Click Chemistry", Macromolecules, American Chemical Society, Washington, DC; US, vol. 44, No. 7, Apr. 11, 2011, pp. 1886-1893.*
Athnasios Touris et al: "Cyclic and Multiblock Polystyrene-block - polysoprene Copolymers by Combining Anionic Polymerization and Azide/Alkyne "Click" Chemistry", Macromolecules, vol. 44, No. 7, Apr. 12, 2011, pp. 1969-1976, XP055024293, ISSN: 0024-9297, DOI: 10..1021/MA102900d cited in the application scheme 1.
Matthew Alexander Flack: "Novel Approaches to the Synthesis of Clicked Block Copolymers", Jan. 1, 2010, XP055024304, Retrieved from the Internet: URL:hhtp://scholar.lib.vt.edu/theses/available/etd-11222010-143912/unrestricted/Flack_MA_T2010.pdf [retrieved on Apr. 12, 2012] scheme 25, p. 44.
Athnasios Touris et al: "Acetylene-Functionalized Lithium Initiators for Anionic Polymerization Powerful Precursors for Click Chemistry", Macromolecules, American Chemical Society, Washington, DC: US vol. 44, No. 7, Apr. 12, 2011, pp. 1886-1893, XP001561524, ISSN: 0024-9297, DOI: 10..1021/ MA102881M [retrieved on Feb. 28, 2011] cited in the application abstract.

* cited by examiner

*Primary Examiner* — Kelechi Egwim
(74) *Attorney, Agent, or Firm* — Dickinson Wright PLLC

(57) ABSTRACT

A process for the synthesis of a diene copolymer comprising at least two blocks, at least one of the blocks being composed of a diene elastomer, characterized in that it comprises a stage of 1,3-dipolar reaction of two polymers defined as being:
  a) a diene elastomer bearing an alkyne functional group at one or each of its chain ends, and
  b) a polymer bearing at least one azide functional group.
This process of synthesis can be adjusted, whatever the nature of the monomers necessary to form each of the blocks of the copolymer. Each block can be synthesized with an appropriate chemistry, independently of the other block.

9 Claims, No Drawings

DIENE COPOLYMER INCLUDING AT LEAST TWO BLOCKS, METHOD FOR SYNTHESIZING SAME AND RUBBER COMPOSITION CONTAINING SAME

This application is a 371 of PCT/EP2012/070452, filed 16 Oct. 2012, which claims benefit of the filing date of FR 1159399, filed 18 Oct. 2011, the entire contents of which is incorporated herein by reference for all purposes.

BACKGROUND

1. Field

Disclosed herein is a process for the synthesis of diene copolymers comprising at least two blocks, one of the blocks being composed of a diene elastomer. This process of synthesis comprises the coupling reaction of an azide-functional polymer with a functional diene elastomer. The present disclosure also relates to such diene copolymers and to the rubber compositions comprising them, in particular for the purpose of an application in vehicle tyres.

2. Description of Related Art

The synthesis of block copolymers is not always simple to control, in particular when one of the monomers may be involved in secondary reactions. The synthesis of block diene copolymers is not free from this difficulty. Various methods of synthesis are generally employed to prepare such block copolymers.

Thus, according to one method of synthesis, the two monomers are successively polymerized by anionic polymerization. This is one of the most well known methods to a person skilled in the art, which consists in polymerizing the diene monomer by the anionic route and then using the elastomer (living anionic chain) thus obtained as macroinitiator for the polymerization of the second monomer, still by the anionic route.

Certain difficulties may occur, depending on the nature of the second monomer. Thus, during the second stage of anionic polymerization, side reactions brought about by the presence of certain functional groups on the second monomer may compete with the polymerization. By way of example, if an ester functional group is present on the second monomer, the polymerization can be accompanied by an addition-elimination reaction which halts the growth of the chains of the second block and modifies the chemical structure of the final product and thus consequently its properties.

Moreover, the anionic polymerization of some monomers is highly exothermic and the kinetics of polymerization are very rapid (of the order of a minute). Many studies have been published relating to additives (LiCl or ROLi, for example) which make it possible to reduce the reactivity of the chain end by complexing and thus to reduce the proportion of secondary reactions, with greater or less success. It is thus not easy to control the anionic polymerization of such monomers.

Another method, developed by Stadler et al. (Macromolecules, 1995, 28, 3080-3097; Macromolecules, 1995, 28, 4558) and Teyssie and Elf Atochem (Patents EP 0 749 987 B1 and EP 0 524 054 B1), is the use of diphenylethylene (DPE) at the end of the polymerization of the diene monomer and the decrease in the reaction temperature (−40° C., for example), making it possible to obtain a lithiated macroinitiator which is much less reactive during the initiation of the second (meth)acrylic monomer. Despite a reactivity reduced by the use of DPE and/or of a lithium salt (LiCl or ROLi, for example) and of a low temperature, it is often difficult to completely prevent the side reactions and the control of the anionic polymerization of the second monomer can remain complicated.

Another method of synthesis of block diene copolymers is the combination of an anionic polymerization and of atom transfer radical polymerization (ATRP). The synthesis of a first diene block by anionic polymerization can be followed by a termination reaction which makes it possible to obtain a polymer functionalized at the chain end by a halogenated group; this halogen atom would make possible the initiation of the ATRP of the second monomer. The functionalization of the anionic chain end by a halogen atom, for example bromine, can be carried out in two stages: (a) the reaction of the living lithiated anionic chain with an epoxide, with the aim of replacing the carbanion by a lithiated oxanion which is less reactive with regard to nucleophilic substitutions, (b) the oxanion will, in a second step, react with the halide. Only the halide reacts by virtue of the decrease in reactivity of the anionic chain end. The polymer functionalized at the chain end by a halogenated group might then act as macroinitiator for the ATRP. This synthetic route was used by Matyjaszewski et al. (Macromol. Chem. Phys., 1999, 200, 1094-1100) for the synthesis of PS-b-PMMA block copolymer.

Nevertheless, this method proves to exhibit numerous difficulties depending on the monomers used. This is because, when the halogenated compound used to functionalize the diene elastomer resulting from the anionic polymerization exhibits two halogenated sites, as is the case for example, with 2-bromo-2-methylpropanoyl bromide, the functionalization can also result in coupling of the living anionic chain by reaction of two living diene elastomer chains with the bihalogenated compound. In addition, a major obstacle to this method of synthesis originates from the presence of pendant double bonds in the diene polymer. This is because, during the ATRP of the second monomer, radical addition reactions on the double bonds of the diene elastomer take place, resulting in the change in the macrostructure, indeed even in crosslinking, resulting in the formation of a gel. Good control of the radical polymerization is thus impossible.

These disadvantages have in particular been demonstrated by the Applicant Companies during various tests employing butadiene and methacrylate as monomers.

SUMMARY

In the light of the above, the technical problem which is posed is that of finding a method of synthesis of diene copolymers comprising at least two blocks, one of the blocks of which is a diene elastomer block, which is adaptable whatever the nature of the monomers employed in this synthesis, while overcoming in particular the abovementioned disadvantages.

The present disclosure proposes to solve this technical problem. This is because the Inventors have developed a process for the synthesis of diene copolymers comprising at least two blocks which carries out the reaction of the polymer blocks with one another, each being obtained separately according to a polymerization method perfectly suited to the nature of the monomers. This makes it possible to overcome the disadvantages encountered with the methods of synthesis envisaged above. In addition, this process of synthesis makes it possible to obtain the block copolymers, the macrostructure of which is controlled, while achieving high yields.

An embodiment of the present invention is a process for the synthesis of a diene copolymer comprising at least two blocks, at least one of the blocks being composed of a diene elastomer, characterized in that it comprises a stage of reaction of 1,3-dipolar type of two polymers defined as being:

a) a diene elastomer bearing an alkyne functional group at one or each of its chain ends, and b) a polymer bearing at least one azide functional group.

Another embodiment of the invention is a diene copolymer comprising at least two blocks, at least one of the blocks being composed of a diene elastomer, characterized in that it comprises a bonding group between two consecutive blocks comprising a 1,2,3-triazolediyl group.

A further embodiment of the invention is a crosslinked or crosslinkable rubber composition based on such a diene copolymer comprising at least two blocks.

Another embodiment of the invention is a vehicle tyre, at least one of the constituent components of which comprises such a rubber composition.

DETAILED DESCRIPTION OF SPECIFIC EMBODIMENTS

Thus, a first embodiment of the invention is a process for the synthesis of a diene copolymer comprising at least two blocks, at least one of the blocks being composed of a diene elastomer, characterized in that it comprises a stage of reaction of two polymers defined as being:

a) a diene elastomer bearing an alkyne functional group at one or each of its chain ends, and b) a polymer bearing at least one azide functional group.

The reaction of the diene elastomer a) with the polymer b) is a quantitative and selective reaction between the azide functional group and a carbon-carbon triple bond, also known as Huisgen 1,3-dipolar cycloaddition reaction. The reaction exhibits a high yield, up to 90%, indeed even 100%.

This reaction exhibits numerous additional advantages. It is carried out under mild operating conditions, such as at low temperatures, without by-products or else inoffensive by-products, without the impurities having an effect, in the absence of solvents or else with use of nontoxic solvents, which, from an industrial viewpoint, represents not insignificant economic, energy and environmental advantages.

Diene elastomer in accordance with embodiments of the invention is understood to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms.

Suitable in particular as conjugated dienes are 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene, 2,4-hexadiene, and the like.

Suitable in particular as vinylaromatic compounds are styrene, ortho-, meta- or para-methylstyrene, the "vinyltoluene" commercial mixture, para(tert-butyl)styrene, methoxystyrenes, vinylmesitylene, divinylbenzene, vinylnaphthalene, and the like.

The copolymers can comprise between 99% and 20% by weight of diene units and from 1% to 80% by weight of vinylaromatic units.

The diene elastomer bearing, at one or each of its chain ends, a group comprising an alkyne functional group in accordance with the invention is preferably selected from the group of the highly unsaturated diene elastomers consisting of polybutadienes (BR), synthetic polyisoprenes (IRs), butadiene copolymers, isoprene copolymers and the mixtures of these elastomers. The butadiene or isoprene copolymers are more preferably selected from the group consisting of copolymers of butadiene and of a vinylaromatic monomer, more particularly the butadiene/styrene copolymer (SBR), isoprene/butadiene copolymers (BIRs), copolymers of isoprene and of a vinylaromatic monomer, more particularly the isoprene/styrene copolymer (SIR), and isoprene/butadiene/styrene copolymers (SBIRs).

Suitable in particular are polybutadienes having a content (mol %) of 1,2-units of between 4% and 80% or those having a content (mol %) of cis-1,4-units of greater than 80%, polyisoprenes, butadiene/styrene copolymers, in particular those having a Tg (glass transition temperature, measured according to ASTM D3418) between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −50° C.

In the case of butadiene/styrene/isoprene copolymers, suitable in particular are those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C.

The diene elastomer can be random, sequential or microsequential. It can have any appropriate microstructure, which depends on the specific conditions under which the polymerization reaction is carried out, such as the presence or absence of a polar and/or randomising agent and the amounts of polar and/or randomising agent employed. These aspects are known and controlled by a person skilled in the art.

The introduction of an alkyne functional group into a diene elastomer can be carried out by an anionic polymerization of the diene monomer with an organometallic initiator bearing such a functional group.

Thus, the diene elastomer bearing, at one or each of its chain ends, an alkyne functional group can be obtained by anionic polymerization employing an organometallic polymerization initiator comprising an alkyne bond. Protective group is understood to mean any protective group known for this purpose, in particular a hydrocarbon group comprising a silicon atom which is preferably a trialkylsilyl group, the alkyl group having from 1 to 5 carbon atoms, and more preferably the trimethylsilyl group.

Suitable in particular as organometallic initiators comprising an alkyne bond are those comprising a carbon-alkali metal bond, preferably a carbon-lithium bond. Mention may be made, as an example of such compounds capable of introducing an alkyne functional group, of alkynyllithium, the alkyne functional group of which is or is not protected, and in particular trialkylsilyl-alkynyllithiums, such as 5-trimethylsilyl-4-pentynyllithium (TMSPLi) and 5-triethyl-silyl-4-pentynyllithium (TESPLi), which are described in the papers Macromolecules 2011, 44, 1886-1893 and Macromolecules 2011, 44, 1969-1976.

The Inventors have also developed novel organometallic initiators comprising an alkyne functional group corresponding to the following formula 1:

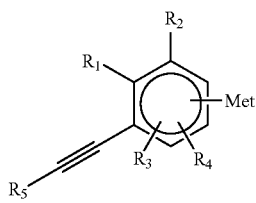

Formula 1 where

Met, which can be borne by the ortho, meta or para position with respect to the group comprising the carbon-carbon triple bond, denotes an alkali metal, preferably Li, Na or K, or a stannyllithium SnLi group; preferably, Met denotes a lithium atom, and $R_1$ and $R_2$, and also $R_3$ and $R_4$, which can be borne by the ortho, meta or paraposition, denote, independently of one another, a hydrogen atom, a $C_1$-$C_{15}$ alkyl group, a cycloalkyl group, a $C_6$-$C_{15}$ aryl group or a $C_7$-$C_{15}$ arylalkyl group which can be separated from the aromatic nucleus by a heteroatom, such as O or S and preferably $R_1$, $R_2$, $R_3$ and $R_4$ each denote a hydrogen atom, $R_5$ denotes a $C_1$-$C_{15}$ alkyl group, a cycloalkyl group, a $C_6$-$C_{15}$ aryl group, a $C_7$-$C_{15}$ arylalkyl group or a protective group for the alkyne functional group.

Mention may be made, as protective group for the alkyne functional group, of a hydrocarbon group comprising a silicon atom which is preferably a trialkylsilyl group, the alkyl group having from 1 to 5 carbon atoms, and more preferably the trimethylsilyl group. The nature of the substituents of the silicon atom does not have an impact on the polymerization, contrary to what was observed with the initiators of the prior art.

According to specific alternative forms, this anionic polymerization initiator corresponds to the formula 1 in which at least one of the following characteristics is adhered to, preferably two and more preferably the three:

Met denotes a lithium atom $R_1$, $R_2$, $R_3$ and $R_4$ each denote a hydrogen atom $R_5$ denotes a trialkylsilyl group, the alkyl group having from 1 to 5 carbon atoms, more preferably the trimethylsilyl group.

More particularly, the anionic polymerization initiator of formula 1 is chosen from trimethylsilylethynylphenyllithium compounds, it being possible for the trimethylsilyl group to be in the ortho, meta or paraposition with respect to the group comprising the carbon-carbon triple bond. These compounds correspond to the following formulae (A), (B) and (C):

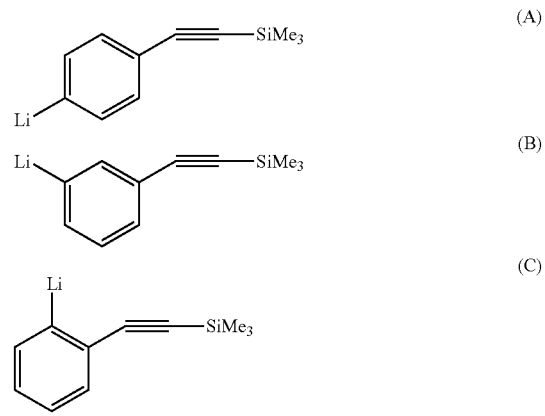

The compounds of formulae (A) and (B) were described in the literature as improving the temperature stability properties of polycarbosilanes in the field of ceramics (Macromolecules, 1999, 32(19), 5998-6002) or for the synthesis of oligomer of formula $[Cp_2ZrMe(C_6H_3C\equiv CSiMe_3]_n$ by reaction of the lithium salt with the compound $Cp_2ZrMeCl$ and thermolysis (Journal of Organometallic Chemistry, 1996, 521(1-2), 425-28).

The synthesis of the anionic polymerization initiator corresponding to the formula 1 can be carried out by a halogen/alkali metal exchange reaction by reaction of a halogenated compound comprising the alkyne functional group with a metal derivative which can be the alkali metal in the metallic form or an organic salt of an alkali metal.

Suitable in particular among the organic salts of an alkali metal are those comprising a carbon/alkali metal bond. According to a preferred embodiment of the invention, the alkali metal is lithium. Mention may be made, among organic salts of lithium, as representative compounds, of aliphatic organolithium derivatives, such as ethyllithium, n-butyllithium (n-BuLi), isobutyllithium, dilithium polymethylenes, such as 1,4-dilithiobutane, and the like.

The reaction of the halogenated compound comprising the alkyne functional group with the metal derivative can be carried out in an inert solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene, or the mixtures of these solvents.

The preparation of the polymerization initiator can be carried out in the presence or absence of a polar additive, it being possible for several types of polar agents to be used, including nonchelating polar agents of THF type and chelating polar agents having, on at least two atoms, at least one nonbonding pair, such as, for example, of tetrahydrofurfuryl ethyl ether or tetramethylethylenediamine type.

The synthesis of the polymerization initiator is generally carried out at a temperature of between 20° C. and 120° C. and preferably in the vicinity of 20° C. to 4° C.

According to an alternative form of the invention, the polymerization initiator can be prepared beforehand separately and in isolated fashion from the polymerization medium.

According to another alternative form of the invention, the initiator can be generated in situ directly in the polymerization medium by contact of the halogenated compound with the metal derivative.

Reference may be made, by way of illustration of this process for the synthesis of the polymerization initiator according to an embodiment of the invention, to the procedure described by Shirai, Yasuhiro et al. in the paper Journal of the American Chemical Society, 2006, 128(41), 13479-13489. The compound is generated by a halogen/lithium exchange reaction between the brominated precursor and tert-BuLi in THF at −80° C.

According to a particularly advantageous alternative form of the invention, the polymerization initiator is an alkyne compound corresponding to the above formula 1. This is because this initiator makes it possible to introduce an alkyne functional group at the chain end of the elastomer with a high functionalization yield which can reach 100%. The polymerization is carried out in a controlled and reproducible way without being disadvantageous to possible post-polymerization reactions, such as functionalization reactions.

The polymerization is preferably carried out in a way known per se in the presence of an inert solvent which can, for example, be an aliphatic or alicyclic hydrocarbon, such as pentane, hexane, heptane, isooctane, cyclohexane, methylcyclohexane, or an aromatic hydrocarbon, such as benzene, toluene or xylene, or mixtures of these solvents.

The solution to be polymerized can also comprise a polar agent of ether type, such as tetrahydrofuran, or of amine type, such as tetramethylethylenediamine. Several types of polar agents can be used, including nonchelating polar agents of THF type and chelating polar agents having, on at least two atoms, at least one nonbonding pair, such as, for example, of tetrahydrofurfuryl ethyl ether or tetramethylethylenediamine type.

It is also possible to add randomising agents, such as sodium alkoxides.

The polymerization can be carried out continuously or batchwise. The polymerization is generally carried out at a temperature of between 20° C. and 120° C. and preferably in the vicinity of 30° C. to 90° C., particularly from 30° C. to 50° C.

The polymerization reaction makes it possible to prepare a living diene elastomer bearing, at the chain end, a group comprising an alkyne functional group.

According to an alternative form of the invention, the polymerization reaction is subsequently halted by the deactivation of the living chains in the way known per se. A diene elastomer bearing, at one chain end, an alkyne functional group is thus obtained.

According to another alternative form of the invention, the living diene elastomer resulting from the polymerization reaction and comprising an alkyne functional group at the nonreactive end of the chain can subsequently be functionalized in order to prepare a functionalized, coupled or star-branched diene elastomer according to the nature of the functionalization agent used. This post-polymerization functionalization is carried out in a way known per se.

The functionalization reaction of the living diene elastomer can take place at a temperature of between −20° C. and 100° C. by addition of a functionalization, coupling and/or star-branching agent to the living polymer chains or vice versa.

As the case may be, the reaction can be carried out in solution or in the gas phase, as described, for example, in Patent EP 1 072 613 B1, which relates to the functionalization by carbon dioxide for the purpose of obtaining monocarboxylic acid polymers.

The functionalization agents can, for example, introduce one or more nonpolar functional groups into the elastomer. Such agents are known per se, such as, for example, $Me_2SiCl_2$, $MeSiCl_3$, $SiCl_4$, 1,6-bis(trichlorosilyl)hexane, $Bu_2SnCl_2$, $SnCl_4$, and the like. This type of functionalization improves, for example, the interaction between the filler and the elastomer or also certain properties of the functionalized elastomer.

The functionalization agents can also introduce one or more polar functional groups into the elastomer. The polar functional group can be chosen, for example, from functional groups of amine, silanol, alkoxysilane, alkoxysilane bearing an amine group, epoxide, ether, ester, hydroxyl or carboxylic acid type, and the like. These functional groups improve in particular the interaction between an inorganic filler and the elastomer.

It is possible to obtain a mixture of elastomer chains bearing, in addition to the alkyne functional group common to all the chains, different functional groups as successively reacting different functionalization agents. For example, it is possible to react in a first step, the living chains with a coupling or star-branching agent and then to react the remaining living chains with a functionalization agent which introduces a functional group at the chain end.

It should be understood that, when the living diene elastomer chains react with a functionalization, coupling or star-branching agent, the diene elastomer will comprise as many alkyne functional groups as living chains which have been functionalized, coupled or star-branched, these alkyne functional groups being located at the end of the chains. Thus, the diene elastomer a) bears a group comprising, at one or each of its chain ends, an alkyne functional group according to the post-polymerization functionalization reaction undergone.

The group resulting from the post-polymerization functionalization can be located at the chain end. It will then be said that the diene elastomer is functionalized at the other chain end. This is generally an elastomer obtained by reaction of a living elastomer with a functionalization agent, that is to say any at least monofunctional monomer in order to react with a living chain end, the functional group being any type of chemical group known by a person skilled in the art, in particular as mentioned above.

The group resulting from the post-polymerization functionalization can be located in the linear main elastomer chain. It will then be said that the diene elastomer is coupled and bears an alkyne functional group at each of its two chain ends. This is generally an elastomer obtained by reaction of a living elastomer with a coupling agent, that is to say any at least difunctional molecule in order to react with a living chain end, the functional group being any type of chemical group known by a person skilled in the art, in particular as mentioned above.

The group resulting from the post-polymerization functionalization can be central, to which n elastomer chains or branches (n>2) are bonded, forming a star-branched structure of the elastomer. It will then be said that the diene elastomer is a star-branched diene elastomer comprising n branches and bears an alkyne functional group at each of its n chain ends. It is generally an elastomer obtained by reaction of a living elastomer with a star-branching agent, that is to say any polyfunctional molecule in order to react with a living chain end, the functional group being any type of chemical group known by a person skilled in the art, in particular as mentioned above.

Thus, the diene elastomer bearing an alkyne functional group at one or each of its chain ends can be defined as corresponding to the formula 2:

(A-E)$_n$-X    Formula 2 in which:
X denotes a hydrocarbon group of valency n, a group resulting from a functionalization, coupling and star-branching agent comprising at least one atom chosen from O, N, Si or Sn;
A is a monovalent radical comprising a protected or unprotected alkyne functional group;
E denotes the diene elastomer, and
n is an integer ranging from 1 to 12, preferably from 1 to 4.

According to alternative forms of the invention, X comprises an amine, silanol, alkoxysilane, alkoxysilane bearing an amine group, epoxide, ether, ester, hydroxyl or carboxylic acid group.

According to other alternative forms of the invention, X comprises an Sn atom or an Si atom. According to these alternative forms, n is generally at least 2 and preferably 2, 3 or 4.

According to yet other alternative forms, A represents a substituted or unsubstituted aliphatic alkynyl radical having from 2 to 15 carbon atoms, preferably from 2 to 5 carbon atoms. According to a preferred aspect of this alternative form, the alkynyl radical is substituted on one of the carbon atoms involved in the carbon-carbon triple bond by a hydrocarbon group comprising a silicon atom which is preferably a trialkylsilyl group, the alkyl group having from 1 to 5 carbon atoms and more preferably 1 or 2 carbon atoms. Thus, A can be a 5-trialkylsilyl-4-pentynyl group, the alkyl group preferably being methyl or ethyl.

According to other alternative forms, A represents a monovalent radical corresponding to the following formula 3:

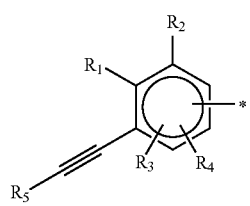

Formula 3 in which:
* denotes a point of bonding with the elastomer chain E which can be borne by the ortho, meta or para position, with respect to the group comprising the carbon-carbon triple bond,
$R_1$ and $R_2$, and also $R_3$ and $R_4$, which can be borne by the ortho, meta or para position, denote, independently of one another, a hydrogen atom, a $C_1$-$C_{15}$ alkyl group, a $C_5$-$C_{15}$ cycloalkyl group, a $C_6$-$C_{15}$ aryl group or a $C_7$-$C_{15}$ arylalkyl group which can be separated from the aromatic nucleus by a heteroatom, such as O or S, and preferably $R_1$, $R_2$, $R_3$ and $R_4$ each denote a hydrogen atom, and
$R_5$ denotes a hydrogen atom, a $C_1$-$C_5$ alkyl group, a cycloalkyl group, a $C_6$-$C_{15}$ aryl group, a $C_7$-$C_{15}$ arylalkyl group or a protective group for the alkyne functional group.

It is understood that the different alternative forms of the invention can be combined with one another.

According to another alternative form of the invention, the diene elastomer is composed of a blend or mixture of diene elastomers corresponding to the formula 2, each bearing, at one or each of its chain ends, a group comprising an alkyne functional group.

According to the embodiment of the invention according to which the alkyne functional group is protected, the process for the synthesis of the block copolymer can comprise a stage of deprotection of the alkyne functional group. This deprotection stage can take place before or after the reaction, with the polymer comprising an azide functional group, of the diene elastomer bearing, at one or each of its chain ends, a group comprising an alkyne functional group. The deprotection is carried out by means known per se. This stage is carried out after the halting of the polymerization or, if appropriate, of the post-polymerization functionalization or also after the reaction with the polymer comprising an azide functional group. It is possible, by way of example, to react the chains functionalized by the protected alkyne group with an acid, a base, a fluorinated derivative, such as tetrabutylammonium fluoride, a silver salt, such as silver nitrate, and the like, in order to deprotect the alkyne functional group. These different methods are described in the work Protective Groups in Organic Synthesis, T. W. Green and P. G. M. Wuts, third edition, 1999. By way of illustration, in the case of a polymerization with an initiator of formula 1, $R_5$ represents a hydrogen atom on conclusion of this stage.

The synthesis of the diene copolymer comprising at least two blocks according to an embodiment of the invention comprises a stage of reaction of 1,3-dipolar type of a) the diene elastomer bearing an alkyne functional group at one or each of its chain ends described above and of b) a polymer bearing at least one azide functional group.

Polymer bearing at least one azide functional group, polymer b), is understood to mean, according to the invention, a polymer which can be written P—(N$_3$)$_m$ P being a polymer and m an integer ranging from 1 to 15, indeed even from 1 to 12, preferably from 1 to 8.

This polymer b) can be obtained by any appropriate means as a function of the type of monomers employed. Mention may be made of chain polymerization, such as anionic or cationic polymerization, radical polymerization, Ziegler-Natta catalytic polymerization, and the like, or polymerization by stages (polycondensation). The polymerization can be carried out in solution or in emulsion. The choice of the polymerization is within the scope of a person skilled in the art.

The polymer b) may also occur commercially; mention may be made, by way of example, of the azide-terminated polystyrene sold by Sigma-Aldrich.

According to certain alternative forms of the invention, the polymer b) bearing at least one azide functional group can also be a polymer obtained from olefinic monomers. Mention may be made, as olefinic monomers, as non-exclusive examples, of monoolefin monomers, such as ethylene, propylene, 1-butene, isobutylene, pentene, methylpentene, 1-hexene, and the like, conjugated diene monomers, such as described above, fluorinated diene monomers, vinyl monomers, such as vinylaromatics (styrene derivatives as defined above and also vinylpyridines, vinyl-N—($C_1$-$C_6$ alkyl)pyrroles, vinyloxazoles, vinylthiazoles, vinylpyrimidines, vinylimidazoles, and the like), $C_1$-$C_{20}$ alkyl ester (meth)acrylates (acrylic acid, acrylamide, methyl acrylate, ethyl acrylate, butyl acrylate, hexyl acrylate, 2-ethylhexyl acrylate, methacrylic acid, methacrylamide, methyl methacrylate, ethyl methacrylate, butyl methacrylate, hexyl methacrylate, 2-ethylhexyl methacrylate), (meth)acrylonitrile, $C_1$-$C_6$ alkyl ester cyanoacrylates, vinyl ketones (vinyl methyl ketone, and the like), vinyl phenyl ketone, vinyl acetate, vinyl acetals, vinyl ethers (vinyl methyl ether, vinyl ethyl ether, vinyl isobutyl ether, and the like), vinyl alcohols, vinyl halides (vinyl chloride, vinylidene chloride, tetrafluoroethylene, vinyl fluoride, vinylidene fluoride, ethylene tetrafluoroethylene, perfluoroalkoxy, and the like), silicon-comprising monomers, such as silanes, siloxanes (dimethylsiloxane, methylhydroxysiloxane, diphenylsiloxane, and the like), carbosilanes, and the like, oxiranes, such as ethylene oxide, propylene oxide, and the like, cyclic esters, such as lactones, lactides, and the like, phosphorus-comprising monomers (polyphosphazene), sulphur-comprising monomers (thiazyl, sulphur nitride, and the like) or boron-comprising monomers (borazylenes). The polymerization of such monomers is known per se. The person skilled in the art will know how to adjust the polymerization technique as a function of the type of monomer to be polymerized.

According to other alternative forms, the polymer b) bearing at least one azide functional group can also be a polymer obtained by polycondensation, such as polyesters, polycarbonates, polyanhydrides, polyamines, polyimines, polyamides, polyimides, polyurethanes, polyureas, polysulfones, polyethersulfones, polyarylenealkylenes, and the like.

However, the radical polymerization exhibits several advantages in the context of embodiments of the invention, in particular as regards the introduction of the azide functional group into the polymer chain. Various radical polymerization techniques are known to a person skilled in the art, namely conventional radical polymerization (Handbook of Radical Polymerization, Wiley-Interscience, 2002), atom transfer radical polymerization (ATRP) (ACS Symp. Ser., 1998, 685, 258-283; ACS Symp. Ser., 2000, 768, 2-26; Prog. Polym. Sci., 2001, 26, 2083-2134; Chem. Rev., 2001, 101, 2921-2990; Advances in Polymer Science, 2002, 159, 2-166), nitroxide-mediated radical polymerization (NMP) (Chem. Rev., 2001, 101, 3661-3688) or reversible addition-fragmentation chain transfer radical polymerization (RAFT or MADIX) (Macromolecules 1998, 31, 5559-5562; Handbook of Radical Polymerization, Wiley-Interscience, 2002, pp. 629-690). The controlled radical polymerization techniques are preferably used in the context of embodiments of the invention, these techniques making possible the synthesis of polymers for which the molar mass, the polydispersity, the topology, the composition and the functionalization are well controlled. Atom transfer radical polymerization (ATRP) is preferably used, this polymerization process resulting in a halogen atom (Cl or Br) being obtained at the polymer chain end. This is because the presence of this halogen atom at the chain end offers the possibility of introducing the azide functional group by using conventional chemical reactions, such as nucleophilic substitution.

One method of synthesis of the polymer b) bearing at least one azide functional group can be summarized by the sequence of the following stages, which are from the range known to a person skilled in the art:
 polymerization of the monomer so as to introduce a transferable atom at the chain end, for example a halogen,
 modification of the chain end (halogen) to give an azide group by reaction with an azide compound, for example trimethylsilyl azide in the presence of TBAF.

In the context of an initiation of the ATRP radical polymerization of the monomer by a halogenated initiator, an initiator comprising a halogen atom, such as bromine, is preferably used. Suitable in particular as initiators are those comprising one or more bromine atoms. Representative compounds are brominated compounds, such as 1-phenylethyl bromide or methyl α-bromoisobutyrate. A difunctional halogenated initiator or a halogenated initiator of higher functionality can also be employed in the preparation of polymers having, at the chain end, at least two halogen atoms, it being possible for the latter to be converted into azide groups after a post-polymerization modification. A polymer b) bearing several azide functional groups is thus obtained.

The brominated initiator is used in combination with a catalyst composed of a transition metal, such as copper, iron, ruthenium, and the like, and of an aminated ligand, such as 2,2'-bipyridine (BiPy), N,N,N',N',N'-pentamethyldiethylenetriamine (PMDETA), hexamethyl-triethylenetetramine (HMTETA), and the like. The CuBr/HMTETA pair is preferably used.

The polymerization can be carried out in bulk or in solution, as the case may be. When it is carried out in solution, it is preferably carried out in a way known per se, in the presence of a solvent which is inert with respect to radical polymerization, which can, for example, be an aliphatic or alicyclic hydrocarbon, such as pentane, hexane, heptane, isooctane, cyclohexane or methylcyclohexane, or an aromatic hydrocarbon, such as benzene, toluene or xylene, or in a more polar solvent, such as dichloromethane, THF, DMF, and the like.

The polymerization is generally carried out at a temperature between 20° C. and 120° C. and preferably in the vicinity of 30° C. to 90° C.

By way of illustration, in order to produce an azide-functional polymer starting from a polymer obtained by ATRP, the procedure described by Matyjaszewski et al. in the paper Macromol. Rapid Commun., 1997, 18, 1057-1064, can be taken up. This method, illustrated below by taking polystyrene for example, can be transposed to any monomer polymerizable by ATRP.

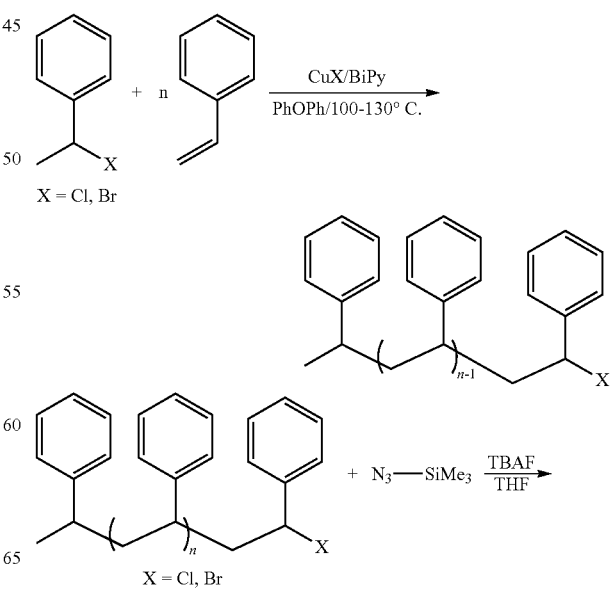

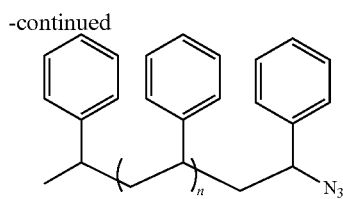

According to an alternative form of the invention, the polymer b) bearing at least one azide functional group is a poly(meth)acrylate bearing at least one azide functional group at the chain end. The poly(meth)acrylate can be obtained by radical polymerization as described above by employing more particularly methyl α-bromoisobutyrate as polymerization initiator and trimethylsilyl azide in the presence of TBAF as post-polymerization reactant for the nucleophilic substitution.

The azide functional group can be introduced into the polymer chains by various routes mentioned in particular in the paper Macromol. Rapid Commun., 2008, 29, 952-981. These routes are listed below:

- by initiation: this route, which consists in using an azide-functional initiator, has been applied in the controlled radical polymerization (ATRP, NMP, RAFT) of styrene, acrylates, N-isopropylacrylamide, and the like, as already mentioned above, and in anionic polymerization by ring opening of oxirane (ethylene oxide) or by ring opening of N-carboxyanhydride (synthesis of azide-functional polypeptide);
- by termination: this route, which consists in carrying out a post-polymerization modification by reaction of $NaN_3$ with a halogen atom (nucleophilic substitution reaction), has been applied to polymers prepared by ATRP, by anionic polymerization or by Ziegler-Natta polymerization;
- by polymerization of an azide-functional monomer: this route, which consists in (co)polymerizing a monomer bearing a pendant azide group, has been applied to the radical copolymerization of (meth)acrylate or styrene derivatives bearing azide functional groups, and the like, or to the ROMP (ring opening metathesis polymerization) of oxynorbornenes bearing pendant azide groups.

A subject-matter of the invention is mainly the synthesis of block diene copolymers, at least one of the blocks being composed of a diene elastomer, characterized in that it comprises a stage of a reaction of two polymers defined as being:
a) a diene elastomer bearing an alkyne functional group at one or each of its chain ends, and
b) a polymer bearing at least one azide functional group,
these two polymers having been defined above.

The reaction of the functional diene elastomer with the azide polymer can be carried out by a Huisgen 1,3-dipolar cycloaddition reaction, that is to say by the reaction, on the one hand, of a carbon-carbon triple bond at the chain end of the diene elastomer and, on the other hand, of an azide functional group at the chain end of the polymer, so as to form a 1,2,3-triazolediyl radical which thus covalently connects the polymer block and the diene elastomer block. A block copolymer is thus obtained which comprises at least one sequence composed of a diene block and of a polymer block connected to one another via a 1,2,3-triazolediyl radical.

The conditions of the reactions for the coupling of the two polymer blocks are to be adjusted as the case may be and can be carried out in solution or not in solution, in the presence or in the absence of a catalyst. The latter is generally based on a transition metal, mainly copper. This cycloaddition reaction is a conventional organic chemistry reaction which can be carried out according to conventional conditions known to a person skilled in the art and mentioned in the literature (Macromol. Rapid Commun., 2008, 29, 952-981; Angew. Chem. Int. Ed., 2007, 46, 1018; Macromol. Rapid Commun., 2005, 26, 514; Macromol. Rapid Commun., 2005, 26, 514; Aust. J. Chem., 2007, 68, 410; Macromol. Rapid Commun., 2008, 29, 1161; J. Polym. Sci., 2008, 46, 3459; Macromolecules, 2006, 39, 6376; Macromolecules, 2007, 40, 796; Chem. Commun., 2005, 5334; Polymer, 2008, 274; EP 2007/054702; Macromolecules, 2007, 40, 5653; Macromol. Rapid Commun., 2008, 29, 1147; Angew. Chem. Int. Ed., 2008, 47, 9311-9313).

The block diene copolymer thus obtained also constitutes a subject-matter of the invention. This block diene copolymer can be defined as comprising at least one sequence corresponding to the following formula:

P-L-E in which:
P represents a polymer as defined above,
E represents a diene elastomer as defined above,
L is a hydrocarbon group comprising a 1,2,3-triazolediyl radical of respective formulae (D) and (F), or a mixture of these two formulae:

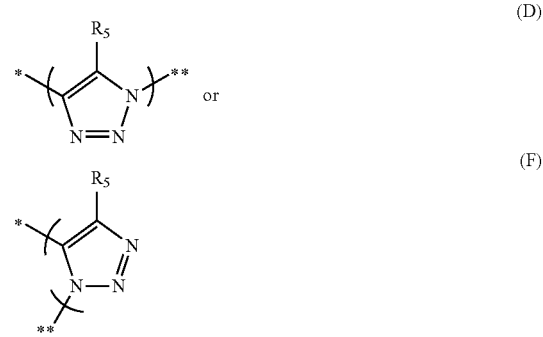

\* indicating a point of bonding to a polymer chain,
\*\* indicating a point of bonding to a P block of the copolymer,
$R_5$ denoting a hydrogen atom, a $C_1$-$C_5$ alkyl group, a cycloalkyl group, a $C_6$-$C_{15}$ aryl group, a $C_7$-$C_5$ arylalkyl group or a protective group for alkyne functional groups.

More particularly, when the elastomer is synthesized by initiating by means of a compound of formula 1 defined above, L is a hydrocarbon group represented by either of the following formulae D1 and F1:

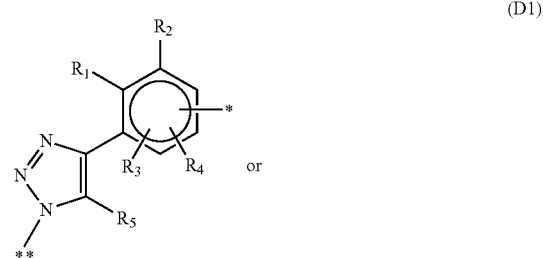

-continued

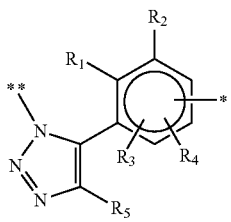

(F1)

R₁ to R₅ and * being as defined above,
** denoting a point of bonding with the polymer chain P.

The copolymer thus obtained can undergo other reactions targeted at modifying its structure.

Mention may be made, by way of example, of hydrogenation. It should be understood that, depending on the number of alkyne functional groups borne by the diene elastomer a) and the number of azide functional groups borne by the polymer b), the copolymer can be linear or star-branched or can form a three-dimensional network comprising at least one P-L-E sequence.

By way of illustration:
when the elastomer a) is $(A-E)_n$-X with n=1 and when the polymer b) comprises an azide functional group, then the block copolymer is linear and corresponds to the formula:

P-L-E-X when the elastomer a) is $(A-E)_n$-X with n=2 and when the polymer b) comprises an azide functional group, then the block copolymer is linear and corresponds to the formula:

P-L-E-X-E-L-P when the elastomer a) is $(A-E)_n$-X with n=1 and when the polymer b) comprises two azide functional groups, then the block copolymer is linear and corresponds to the formula:

X-E-L-P-L-E-X when the elastomer a) is $(A-E)_n$-X with n=2 and when the polymer b) comprises two azide functional groups, then the block copolymer is linear and corresponds to the formula:

... —X-E-L-P-L-E-X-E-L-P-L-E-X— ...

the length of the chain being determined by the proportion of the different polymer blocks. Once these have been consumed or else if the block in deficit is consumed, the cycloaddition reaction is then halted.

when the elastomer a) is $(A-E)_n$-X with n=1 and when the polymer b) comprises m azide functional groups, m being an integer greater than or equal to 3, then the block copolymer is star-branched and corresponds to the formula:

$(X-E-L)_m$-P when the elastomer a) is $(A-E)_n$-X with n greater than or equal to 3 and when the polymer b) comprises one azide functional group, then the block copolymer is star-branched and corresponds to the formula:

$(P-L-E)_n$-X when the elastomer a) is $(A-E)_n$-X with n greater than or equal to 3 and when the polymer b) comprises at least two azide functional groups, then the block copolymer is a three-dimensional network comprising the sequence P-L-E, each E being bonded to an X group and an L group, each X being bonded to n (at least three) E elastomers and each polymer P being bonded to at least two L groups.

A, X, E, P, L, m and n being as defined above.

The block diene copolymers in accordance with embodiments of the invention can advantageously be used in reinforced rubber compositions in which they may, according to the nature of the blocks, improve certain properties thereof. The choice of the nature of the blocks can be made judiciously as a function of the type of compromise in properties which it is desired to achieve. Thus, an application as tyre for a motor vehicle can be targeted and the choice of the type of blocks can be made accordingly.

Such reinforced rubber compositions for applications in tyres also form embodiments of the invention. These rubber compositions comprise at least one block diene copolymer obtained by the process of synthesis according to embodiments of the invention. This block copolymer can optionally be used as a blend with at least one or more elastomers conventionally used in rubber compositions for tyres and chosen from natural rubber, synthetic diene elastomers, optionally coupled and/or star-branched and/or also partially or completely functionalized, synthetic elastomers other than diene elastomers, indeed even polymers other than elastomers.

The reinforcing filler present in the rubber composition is chosen from inorganic fillers, such as silica, organic fillers, such as carbon black, or the mixtures of these fillers.

These compositions can additionally comprise various additives generally present in rubber compositions intended in particular for tyres for motor vehicles. Mention will be made, for example, of rubber/filler bonding agents, nonreinforcing fillers, various processing aids or other stabilizing agents, plasticizers, pigments, antioxidants, antifatigue agents, antiozonant waxes, adhesion promoters, reinforcing or plasticizing resins, a crosslinking system based either on sulphur and/or on peroxide and/or on bismaleimides, crosslinking activators comprising zinc monoxide and stearic acid, guanidine derivatives, extending oils or one or more agents for covering the silica.

The abovementioned characteristics of embodiments of the present invention, and also others, will be better understood on reading the following description of several exemplary embodiments of the invention, given by way of illustration and without implied limitation, in connection with the appendices.

EXEMPLARY EMBODIMENT OF THE INVENTION

Measurements and Tests Used

Experimental techniques used for the characterization before curing of the polymers obtained:

(a) Determination of the distribution of molar masses by the triple-detection size exclusion chromatography (3D-SEC) technique.

1) Principle of the measurement:
Size exclusion chromatography (SEC) makes it possible to separate macromolecules in solution according to their size through columns filled with a porous gel. The macromolecules are separated according to their hydrodynamic volume, the bulkiest being eluted first.

In combination with 3 detectors (3D), a refractometer, a viscometer and a 90° light scattering detector, SEC makes it possible to grasp the distribution of absolute molar masses of a polymer. The different absolute number-average (Mn) and weight-average (Mw) molar masses and the polydispersity index (PI=Mw/Mn) can also be calculated.

2) Preparation of the polymer:

There is no specific treatment of the polymer sample before analysis. The latter is simply dissolved in tetrahydrofuran +1% by volume of diisopropylamine+1% by volume of triethylamine at a concentration of approximately 1 g/l. The solution is then filtered through a filter with a porosity of 0.45 μm before injection.

3) 3D-SEC analysis:

The apparatus used is a Waters Alliance chromatograph. The elution solvent is tetrahydrofuran +1% by volume of diisopropylamine+1% by volume of triethylamine, the flow rate is 0.5 ml/min and the temperature of the system is 35° C. A set of four Polymer Laboratories columns in series is used, these columns having the trade names: two Mixed A LS and two Mixed B LS.

The injected volume of the solution of the polymer sample is 100 μl. The detection system used is TDA 302 from Viscotek. It is composed of a differential refractometer, of a differential viscometer and of a 90° light scattering detector. For these 3 detectors, the wavelength is 670 nm. For the calculation of the average molar masses, the value of the increment in refractive index dn/dC of the polymer solution is integrated, which value is defined beforehand in tetrahydrofuran +1% by volume of diisopropylamine +1% by volume of triethylamine at 35° C. and 670 nm. The software for making use of the data is the Omnisec system from Viscotek.

(b) The glass transition temperatures Tg of the polymers are measured using a differential scanning calorimeter. The analysis is carried out according to the requirements of Standard ASTM D3418-08.

(c) The NMR analyses are carried out on a Bruker Avance 500 MHz spectrometer equipped with a 5 mm BBIz-grade "broad band" probe. The quantitative $^1$H NMR experiment uses a simple 30° pulse sequence and a repetition time of 3 seconds. The samples are dissolved in carbon disulfide ($CS_2$). 100 μl of deuterated cyclohexane ($C_6D_{12}$) are added for the lock signal.

The $^1$H NMR spectrum makes it possible to quantify the $(CH_3)_3Si$ units by integration of the signal characteristic of the $SiCH_3$ protons between 0.20 ppm and 0.10 ppm.

The $^1$H-$^{29}$Si HMQC 2D NMR spectrum makes it possible to confirm the nature of the functional group by virtue of the chemical shift values of the silicon cores and of the protons in the 2J vicinity (via 2 bonds).

(d) Near infrared (NIR) spectroscopy is used to quantitatively determine the microstructure of the elastomer (relative distribution of the 1,2-vinyl, trans-1,4 and cis-1,4 butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}$C NMR. The microstructure is then calculated from the NIR spectrum of an elastomer film having a thickness of approximately 730 μm. The spectrum is acquired in transmission mode between 4000 and 6200 cm$^{-1}$ with a resolution of 2 cm$^{-1}$ using a Bruker Tensor 37 Fourier-transform near-infrared spectrometer equipped with an InGaAs detector cooled by the Peltier effect.

Middle-infrared spectroscopy makes it possible to qualitatively demonstrate the consumption of the alkyne and azide functional groups during the click reaction. The spectrum is acquired in transmission mode between 4000 and 400 cm$^{-1}$ with a resolution of 2 cm$^{-1}$ using a Vertex 70-2 Fourier-transform spectrometer equipped with a DTGS detector.

Example 1

Synthesis of Protected Acetylene-Functional Polybutadiene According to the Invention

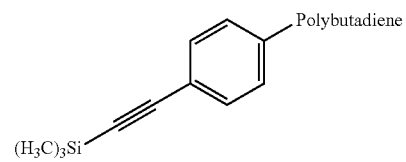

A/Synthesis of the initiator:

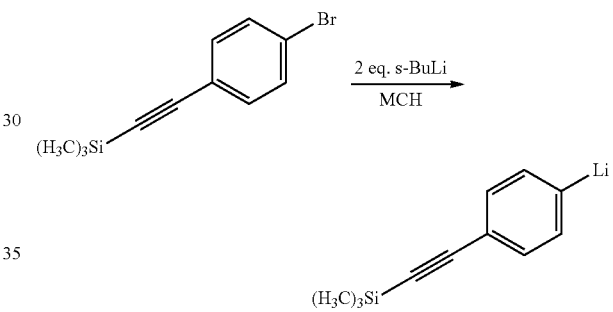

The protected acetylene-functional initiator is prepared by dissolution of 1.9 g (7.5×10$^{-3}$ mol) of 1-bromo-4-(trimethylsilylethynyl)phenyle in 65 ml of methylcyclohexane at ambient temperature under nitrogen, followed by the addition of 0.11 ml of tetramethylethylenediamine and 11.7 ml (15×10$^{-3}$ mol) of a 1.28 mol/l s-BuLi solution. The halogen/lithium exchange reaction is left stirring at ambient temperature for 45 minutes and then the initiator solution is assayed by Gilman-type assaying. The concentration of active entity is 0.114 mol/l.

B/Synthesis of the protected acetylene-functional polybutadiene:

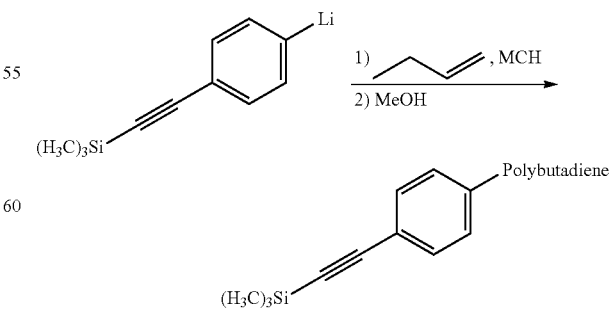

Anionic polymerization is carried out in a capped bottle with moderate stirring and under an inert nitrogen atmosphere. Before beginning the polymerization, 94 ml of methylcyclohexane are introduced into the bottle. The bottle is capped and sparging with nitrogen is carried out for 10 minutes. 15 ml of butadiene are subsequently injected into the bottle. A preneutralization of the impurities is carried out by metered addition of n-BuLi directly onto the mixture of monomer, solvent and optionally polar agent.

The initiator solution is added to this preneutralized mixture of solvent and butadiene. The temperature of the reaction medium is 40° C. At the end of polymerization, a solution of methanol in solution in methylcyclohexane is added to the living polymer in order to protonate the living chains.

The polymer solution is subjected to an antioxidizing treatment by addition of 0.2 part per hundred parts of elastomers (phr) of 4,4'-methylenebis(2,6-di(tert-butyl)phenol) and 0.2 part per hundred parts of elastomers (phr) of N-(1,3-dimethylbutyl)-N'-phenyl-p-phenylenediamine and then the polymer is dried by stoving at 60° C. for 1 day. It can also be used directly in solution for the stage of deprotection of the acetylene functional group.

The degree of conversion is 80%. The functionalization yield, quantified by $^1$H NMR, is 90%. The polybutadiene exhibits a molar content of vinyl unit of 31%. The SEC characterizations indicate an Mn=54 000 g/mol and a PI=1.11. The IR analysis shows the presence of a band at approximately 2159 cm$^{-1}$ corresponding to the vibrational band of the protected acetylene. The Tg of the polymer is −79° C.

Example 2

Synthesis of Acetylene-Functional Polybutadiene from the Protected Acetylene-Functional Polybutadiene

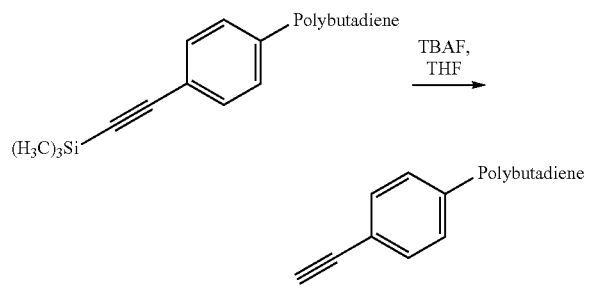

2 g of polybutadiene (Mn=54 000 g/mol and PI=1.11) are dissolved in 12 ml of THF. 0.37 ml (0.37 mmol) of a 1M solution of TBAF in THF is added to the polymer solution. The reaction medium is left stirring at ambient temperature for 24 h and then the polymer is precipitated from methanol. The polymer is redissolved in toluene and then subjected to an antioxidizing treatment by addition of 0.2 part by a hundred parts of elastomers (pch) of 4,4'-methylenebis(2,6-di(tert-butyl)phenol) and 0.2 part per hundred parts of elastomers (phr) of N-(1,3-dimethylbutyl)-N'-phenyl-p-phenylenediamine. The polymer is dried by stoving at 60° C. for 1 day and 1.8 g of polymer are recovered.

The deprotection yield, estimated by $^1$H NMR, is 100%. The IR analysis demonstrates the disappearance of the band at 2159 cm$^{-1}$ and the presence of a new band at approximately 2110 cm$^{-1}$ corresponding to the vibrational band of the deprotected acetylene.

The polybutadiene bearing an alkyne functional group at the chain end in accordance with the invention is thus obtained.

This polybutadiene is perfectly suited to the synthesis of a block copolymer by reaction with a polymer bearing an azide functional group at the chain end.

Example 3

Synthesis of Halogenated Poly(Methyl Methacrylate)

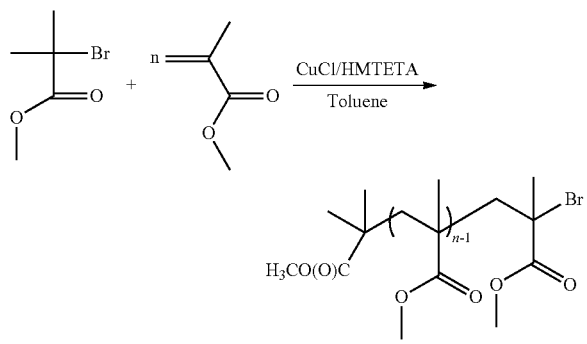

24.75 mg (250 μmol) of CuCl, 136 μl of HMTETA (500 μmol) and 15.23 ml (0.142 mol) of MMA are introduced under a stream of nitrogen into a Schlenk tube provided with a magnetic bar. The mixture is dissolved in 15.3 ml of toluene. After dissolution, 48.76 mg (0.269 mmol) of methyl α-bromoisobutyrate are added and then 3 degassing (vacuum/nitrogen) cycles are carried out. The round-bottomed reaction flask under nitrogen is placed in an oil bath at 60° C. for a period of time of 20 hours.

At the end of the reaction, the reaction mixture is passed through an alumina column with toluene or THF as eluent in order to remove the catalytic copper residues. The solution obtained is concentrated on a rotary evaporator and the polymer is precipitated from methanol. The polymer is dried overnight in an oven at 60° C. under vacuum and 13.5 g of polymer are recovered.

The polymer, characterized by SEC, has an Mn=55 400 g/mol and a PI=1.08. The Tg of the polymer is 113° C.

Example 4

Synthesis of Azide-Functional Poly(Methyl Methacrylate)

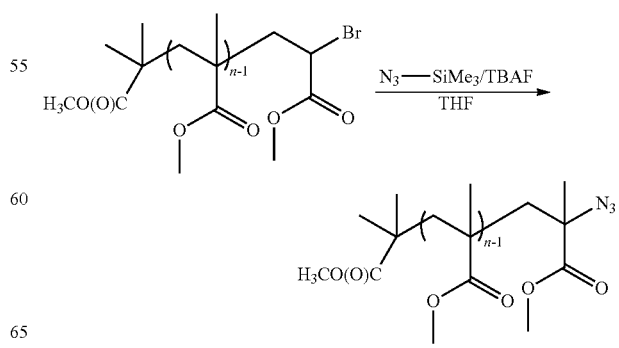

3 g ($5.4 \times 10^{-5}$ mol, 1 eq.) of bromine-functional PMMA are dissolved in 15 ml of anhydrous THF in a two-necked round-bottomed flask equipped with a magnetic bar. 0.54 ml of a 1M solution of trimethylsilyl azide in THF (10 eq.) and 0.54 ml of TBAF (10 eq.) are added to the polymer. The functionalization reaction is left stirring at 40° C. for 5 days. The reaction medium is concentrated on a rotary evaporator and the polymer is precipitated from methanol. The polymer is dried in an oven under vacuum at 60° C. overnight and 2.8 g of polymer are recovered.

The IR analysis demonstrates the presence of a band at approximately 2115 $cm^{-1}$ corresponding to the vibrational band of the azide.

Example 5

Synthesis of the Polybutadiene/Poly(Methyl Methacrylate) Block Copolymer

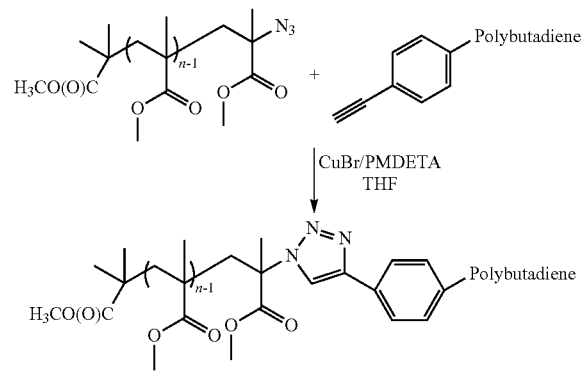

920 mg of azide-functional PMMA (Mn=55 400 g/mol and PI=1.08) ($1.66 \times 10^{-5}$ mol, 0.9 eq.) and 1 g of acetylene-functional PB (Mn=54000 g/mol and PI=1.1) ($1.85 \times 10^{-5}$ mol, 1 eq.) are introduced into and dissolved in 15 ml of anhydrous THF in a two-necked round-bottomed flask equipped with a magnetic bar. After dissolution of the polymers, 20 μl (2 eq.) of PMDETA (pentamethyldiethylenetriamine) are injected under a stream of nitrogen. Several degassing (vacuum/nitrogen) cycles are carried out.

6.875 mg of CuBr are introduced into a predried Schlenk tube equipped with a magnetic bar and the solution of polymers and PMDETA is added to the CuBr under a stream of nitrogen. The reaction medium is heated in an oil bath at 55° C. and left stirring for 48 hours.

The reaction medium is passed through an alumina column in order to remove the copper residues and is then concentrated on a rotary evaporator. The copolymer is precipitated from methanol. The copolymer, redissolved in toluene and then subjected to an antioxidizing treatment by addition of 0.2 part per hundred parts of elastomers (phr) of 4,4'-methylenebis(2,6-di(tert-butyl)phenol) and 0.2 part per hundred parts of elastomers (phr) of N-(1,3-dimethylbutyl)-N'-phenyl-p-phenylenediamine, is dried by stoving at 60° C. for one day. 1.5 g of copolymer are recovered after drying.

The block copolymer, analyzed by IR, demonstrated the disappearance of the two bands corresponding to the acetylene and to the azide. The NMR analysis indicated the disappearance of the signal of the proton of the acetylene at 2.9 ppm. The SEC characterization demonstrated a purity of the copolymer of at least 90% (Mn=105 400 g/mol and a PI=1.2). The copolymer has two Tg values of the order of −79° C. and 113° C.

Example 6

Synthesis of the Polybutadiene/Polystyrene Block Copolymer

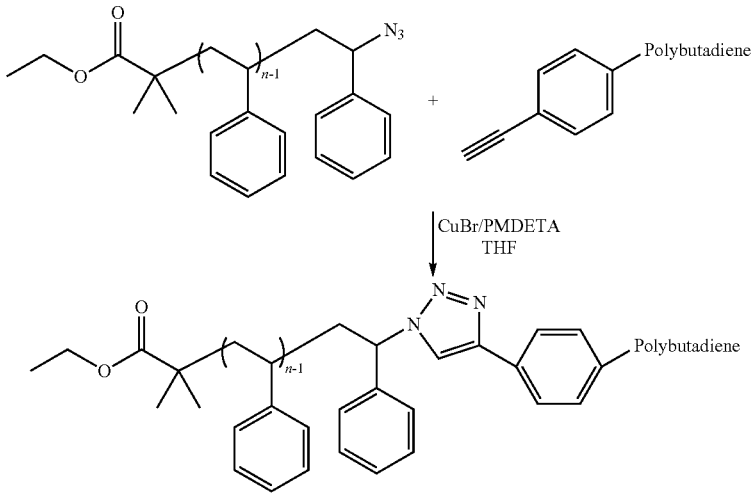

920 mg of azide-functional polystyrene (Mn=2500 g/mol and PI=1.3) ($1.96 \times 10^{-5}$ mol, 0.94 eq.), sold by Sigma-Aldrich, and 1 g of acetylene-functional PB (Mn=48 000 g/mol and PI=1.1), at 94% according to the $^1$H NMR analysis ($2.08 \times 10^{-5}$ mol, 1 eq.) are introduced into and dissolved in 15 ml of anhydrous THF in a two-necked round-bottomed flask equipped with a magnetic bar. After dissolution of the polymers, 23 μl of PMDETA are injected under a stream of nitrogen. Several degassing (vacuum/nitrogen) cycles are carried out.

7.73 mg of CuBr are introduced into a predried Schlenk tube equipped with a magnetic bar and the solution of polymers and PMDETA is added to the CuBr under a stream of nitrogen. The reaction mixture is heated in an oil bath at 55° C. and left stirring for 48 hours.

The reaction medium is passed through an alumina column in order to remove the copper residues and then concentrated on a rotary evaporator. The copolymer is precipitated from methanol. The copolymer, redissolved in toluene and then subjected to an antioxidizing treatment by addition of 0.2 part per hundred parts of elastomers (phr) of 4,4'-methylenebis(2,6-di(tert-butyl)phenol) and 0.2 part per hundred parts of elastomers (phr) of N-(1,3-dimethylbutyl)-N'-phenyl-p-phenylenediamine, is dried by stoving at 60° C. for one day. 1.5 g of copolymer are recovered after drying.

The block copolymer, analyzed by IR, demonstrated the disappearance of the two bands band at 2092 cm$^{-1}$ characteristic of the starting polystyrene and of the band at 2110 cm$^{-1}$ characteristic of the deprotected acetylene. The NMR analysis indicated the disappearance of the signal of the proton of the acetylene at 2.9 ppm. The SEC characterization demonstrated a purity of the copolymer of at least 90% (Mn=51 500 g/mol and a PI=1.2). The copolymer has two Tg values of the order of −80° C. and 75° C.

The invention claimed is:

1. A process for the synthesis of a diene copolymer comprising at least two blocks, at least one of the blocks being composed of a diene elastomer, comprising a 1,3-dipolar reaction of two polymers defined as being:
   a diene elastomer bearing an alkyne functional group at one or each of its chain ends, and
   a polymer bearing at least one azide functional group.

2. The process for the synthesis of a diene block copolymer according to claim 1, wherein the diene elastomer bears an alkyne functional group at one or each of its chain ends corresponds to the following formula 2:

$$(A-E)_n-X \quad \text{Formula 2}$$

in which wherein:
   X denotes a hydrocarbon group of valency n or a group resulting from a functionalization, coupling and star-branching agent comprising at least one atom chosen from O, N, Si or Sn;
   A is a monovalent hydrocarbon radical comprising an alkyne functional group;
   E denotes the diene elastomer, and
   n is an integer ranging from 1 to 12.

3. The process for the synthesis of a diene block copolymer according to claim 2, wherein X comprises at least one group selected from the group consisting of amine, silanol, alkoxysilane, alkoxysilane bearing an amine group, epoxide, ether, ester, hydroxyl, and carboxylic acid groups.

4. The process for the synthesis of a diene block copolymer according to claim 2, wherein A represents a substituted or unsubstituted aliphatic alkynyl radical having from 2 to 15 carbon atoms.

5. The process for the synthesis of a diene block copolymer according to claim 4, wherein A represents a 5-trialkylsilyl-4-pentynyl group.

6. The process for the synthesis of a diene block copolymer according to claim 2, wherein A represents a monovalent radical corresponding to the following formula 3:

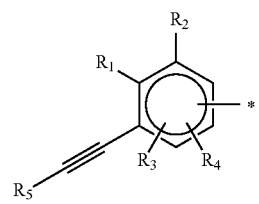

Formula 3 in which wherein:
* denotes a point of bonding with the elastomer chain E which is located in the ortho, meta or para position of A with respect to the group comprising the carbon-carbon triple bond, $R_1$ and $R_2$, and also $R_3$ and $R_4$, which can be borne by the ortho, meta or para position, denote, independently of one another, denote a hydrogen atom, a $C_1$-$C_{15}$ alkyl group, a $C_5$-$C_{15}$ cycloalkyl group, a $C_6$-$C_{15}$ aryl group or a $C_7$-$C_{15}$ arylalkyl group which can be separated from the aromatic nucleus by a heteroatom, such as O or S, and $R_5$ denotes a hydrogen atom, a $C_1$-$C_5$ alkyl group, a cycloalkyl group, a $C_6$-$C_{15}$ aryl group, a $C_7$-$C_{15}$ arylalkyl group, or a protective group for the alkyne functional group.

7. The process for the synthesis of a diene block copolymer according to claim 1, further comprising, prior to the reaction of the two polymers a) and b), synthesis of the diene elastomer comprising the anionic polymerization of at least one conjugated diene monomer initiated by an organolithium compound comprising an alkyne bond, thereby preparing a living diene elastomer bearing, at a chain end, a protected or unprotected alkyne bond.

8. The process for the synthesis of a diene block copolymer according to claim 7, further comprising, on conclusion of the anionic polymerization stage, subjecting the living elastomer to a functionalization by reaction with a functionalization, coupling, or star-branching agent thereby forming a diene elastomer bearing a protected or unprotected alkyne functional group at one or each of its chain ends.

9. The process for the synthesis of a diene block copolymer according to claim 1, further comprising deprotecting of the alkyne functional group.

* * * * *